(12) United States Patent
Anchi et al.

(10) Patent No.: US 11,385,824 B2
(45) Date of Patent: Jul. 12, 2022

(54) AUTOMATED SEAMLESS MIGRATION ACROSS ACCESS PROTOCOLS FOR A LOGICAL STORAGE DEVICE

(71) Applicant: EMC IP Holding Company LLC, Hopkinton, MA (US)

(72) Inventors: Amit Pundalik Anchi, Bangalore (IN); Vinay G. Rao, Bangalore (IN); Sanjib Mallick, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 17/106,788

(22) Filed: Nov. 30, 2020

(65) Prior Publication Data
US 2022/0171559 A1  Jun. 2, 2022

(51) Int. Cl.
*G06F 3/06* (2006.01)
*G06F 13/42* (2006.01)
*G06F 9/455* (2018.01)

(52) U.S. Cl.
CPC .......... *G06F 3/0647* (2013.01); *G06F 3/0604* (2013.01); *G06F 3/0679* (2013.01);
(Continued)

(58) Field of Classification Search
CPC .... G06F 3/0647; G06F 3/0604; G06F 3/0679; G06F 9/45558; G06F 13/4221; G06F 2009/45583; G06F 2213/0036
(Continued)

(56) References Cited

U.S. PATENT DOCUMENTS 6,567,397 B1  5/2003 Campana et al.
6,687,746 B1  2/2004 Shuster et al.
(Continued)

FOREIGN PATENT DOCUMENTS

CN  103677927 B  2/2017
EP  1117028 A2  7/2001
EP  2667569 A1  11/2013

OTHER PUBLICATIONS

PCT/US2019/052549, WO, Dec. 4, 2019, International Search Report and Written Opinion.
(Continued)

*Primary Examiner* — Christopher B Shin
(74) *Attorney, Agent, or Firm* — Ryan, Mason & Lewis, LLP

(57) ABSTRACT

An apparatus in one embodiment stores a first version of an operating system data structure comprising a first identifier of a logical storage device associated with a first access protocol, and in conjunction with migration of the logical storage device from utilization of the first access protocol to utilization of a second access protocol, temporarily continues to present information from the first version of the operating system data structure in response to one or more requests relating to the logical storage device, obtains a second identifier of the logical storage device associated with the second access protocol, stores a second version of the operating system data structure comprising the second identifier of the logical storage device associated with the second access protocol, and switches from presenting information from the first version of the operating system data structure to presenting information from the second version of the operating system data structure.

20 Claims, 3 Drawing Sheets

(52) U.S. Cl.
CPC ...... *G06F 9/45558* (2013.01); *G06F 13/4221* (2013.01); *G06F 2009/45583* (2013.01); *G06F 2213/0036* (2013.01)

(58) Field of Classification Search
USPC ........................................................ 711/154
See application file for complete search history.

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2014/0122755 A1* | 5/2014 | Chandra ............ G06F 13/4295 710/106 |
| 2015/0207673 A1* | 7/2015 | Cui ........................ H04L 41/06 370/228 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2021/0263665 A1* | 8/2021 | Rao ........................ G06F 3/0604 |
| 2021/0297363 A1* | 9/2021 | Charles .................. H04L 45/42 |

OTHER PUBLICATIONS

PCT/US2019/053204, WO, Dec. 16, 2019, International Search Report and Written Opinion.
PCT/US2019/053473, WO, Dec. 19, 2019, International Search Report and Written Opinion.
PCT/US2019/067144, WO, May 4, 2020, International Search Report and Written Opinion.
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
U.S. Appl. No. 16/697,393 filed in the name of Vinay G. Rao et al. filed Nov. 27, 2019, and entitled "Automated Seamless Migration of Logical Storage Devices."
U.S. Appl. No. 16/710,828 filed in the name of Amit Pundalik Anchi et al. filed Dec. 11, 2019, and entitled "Automated Seamless Migration with Signature Issue Resolution."
U.S. Appl. No. 16/793,262 filed in the name of Amit Pundalik Anchi et al. filed Feb. 18, 2020, and entitled "Non-Disruptive Transformation of a Logical Storage Device from a First Access Protocol to a Second Access Protocol."
U.S. Appl. No. 16/797,671 filed in the name of Vinay G. Rao et al. filed Feb. 21, 2020, and entitled "Host Device with Efficient

(56) References Cited

OTHER PUBLICATIONS

Automated Seamless Migration of Logical Storage Devices Across Multiple Access Protocols."

\* cited by examiner

AUTOMATED SEAMLESS MIGRATION ACROSS ACCESS PROTOCOLS FOR A LOGICAL STORAGE DEVICE

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols.

A storage system can support multiple access protocols like SCSI and NVMe to its storage devices that are presented to host devices and their applications. In a storage system that supports both SCSI and NVMe access protocols for storage connectivity, transforming the device access from SCSI to NVMe using conventional techniques can be problematic. For example, host-based seamless migration in these and other contexts can be inefficient, consuming significant amounts of computational and network resources of the host device. Such requirements of conventional approaches can negatively impact the seamless migration process and thereby degrade overall system performance. Accordingly, a need exists for improved migration techniques that can avoid such drawbacks of conventional approaches.

SUMMARY

Illustrative embodiments provide automated seamless migration across access protocols for a logical storage device. For example, one or more embodiments can alter the particular access protocol through which a given logical storage volume or other logical storage device is accessed by one or more host devices, illustratively from a particular SCSI access protocol, such as SCSI over Fibre Channel (SCSI-FC), to a particular NVMe access protocol, such as NVMe over Fabrics (NVMeF), or vice versa, without disrupting any host device applications that utilize that logical storage device.

Such arrangements illustratively involve storing different versions of one or more host device operating system (OS) data structures in order to facilitate the seamless migration across the multiple access protocols. Some embodiments disclosed herein utilize a multi-path layer of one or more host devices in performing the migration across the multiple access protocols, in a manner that ensures that the logical storage device appears to a given host device OS as a single logical storage device.

In one embodiment, an apparatus comprises at least one processing device comprising a processor and a memory coupled to the processor. The at least one processing device is configured to store a first version of an operating system data structure comprising a first identifier of a logical storage device associated with a first access protocol, and in conjunction with migration of the logical storage device from utilization of the first access protocol to utilization of a second access protocol different than the first access protocol, to temporarily continue to present information from the first version of the operating system data structure in response to one or more requests relating to the logical storage device, to obtain a second identifier of the logical storage device associated with the second access protocol, to store a second version of the operating system data structure comprising the second identifier of the logical storage device associated with the second access protocol, and to switch from presenting information from the first version of the operating system data structure to presenting information from the second version of the operating system data structure.

In some embodiments, the switching from presenting information from the first version of the operating system data structure to presenting information from the second version of the operating system data structure is timed to ensure that the logical storage device appears to a host operating system as the same device both before and after the migration from the first access protocol to the second access protocol.

As indicated above, the first access protocol in some embodiments comprises a SCSI access protocol and the second access protocol comprises an NVMe access protocol, such as respective SCSI-FC and NVMeF access protocols, although a wide variety of other types of storage access protocols can be used.

In some embodiments, the at least one processing device is further configured to receive an access protocol change notification, and responsive to receipt of the access protocol change notification, to store the first version of the operating system data structure comprising the first identifier of the logical storage device associated with the first access protocol. The access protocol change notification may comprise, for example, a check condition notification received from a storage system that includes the logical storage device, or at least one command entered via a user interface of a host device coupled to the storage system.

The at least one processing device illustratively comprises at least a portion of at least one host device coupled to a storage system via at least one network.

The at least one host device illustratively comprises a multi-path layer, with the multi-path layer comprising at least one multi-path input-output (MPIO) driver configured to control delivery of IO operations from the at least one host device to the storage system over selected paths through the network.

In some embodiments, the at least one MPIO driver is configured to store the first and second versions of the operating system data structure and to control the migration of the logical storage device from utilization of the first access protocol to utilization of the second access protocol.

The at least one processing device in some embodiments is further configured to obtain the first identifier of the logical storage device associated with the first access protocol by sending a designated command in the first access protocol to a storage system and receiving the first identifier from the storage system in response to the designated command in the first access protocol.

Additionally or alternatively, obtaining the second identifier of the logical storage device associated with the second access protocol illustratively comprises sending a designated command in the second access protocol to the storage system and receiving the second identifier from the storage system in response to the designated command in the second access protocol.

In some embodiments, the first version of the operating system data structure comprises a virtual machine file system header that includes the first identifier of the logical storage device and the second version of the operating system data structure comprises the virtual machine file system header updated to replace the first identifier of the logical storage device with the second identifier of the logical storage device.

The at least one processing device in some embodiments is further configured, in conjunction with the migration of the logical storage device from utilization of the first access protocol to utilization of the second access protocol, to temporarily move at least one application that utilizes the logical storage device from a first host device configured to access the logical storage device to a second host device configured to access the logical storage device, to change the access protocol for the logical storage device from the first access protocol to the second access protocol on the second host device, and to subsequently move said at least one application back from the second host device to the first host device.

In conjunction with the temporary move of said at least one application from the first host device to the second host device, the at least one processing device in some embodiments is illustratively further configured to modify a masking of the logical storage device to the first host device from a first masking utilizing the first access protocol to a second masking utilizing the second access protocol.

The switching in presenting information from the first version of the operating system data structure to presenting information from the second version of the operating system data structure in some embodiments is timed to occur subsequent to completion of the modification in the masking of the logical storage device to the first host device from the first masking utilizing the first access protocol to the second masking utilizing the second access protocol.

Additionally or alternatively, the at least one processing device is further configured, in conjunction with the subsequent move of said at least one application back from the second host device to the first host device, to modify a masking of the logical storage device to the second host device from a first masking utilizing the first access protocol to a second masking utilizing the second access protocol.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
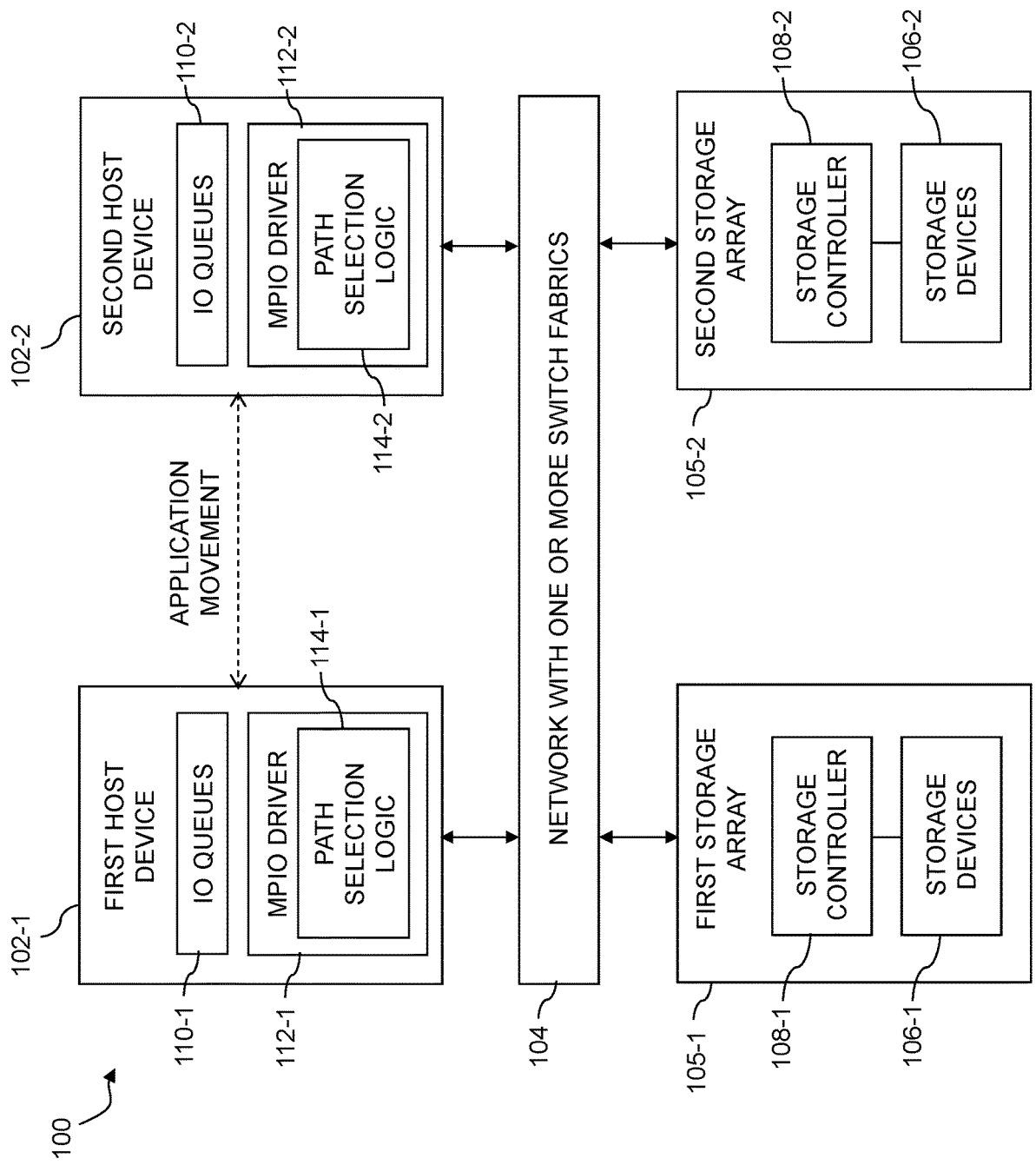
FIG. 1 is a block diagram of an information processing system configured with functionality for automated seamless migration across access protocols utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

It is assumed in illustrative embodiments that the host devices 102 are configured to support such application movement between those host devices, as indicated by the horizontal dashed line in the figure.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume implemented on one or both of the storage arrays 105 in the system 100 illustratively comprises a set of one or more LUNs or other storage volumes of one or both of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "automated seamless migration" of logical storage devices of the storage arrays 105. Such automated seamless migration functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell Technologies, suitably modified in the manner disclosed herein to support automated seamless migration across access protocols. Other types of MPIO drivers from other driver vendors may be suitably modified to incorporate functionality for automated seamless migration as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of automated seamless migration functionality of host device 102-1. Other host device components, such as migration control logic implemented in one or more host device processors, can additionally or alternatively implement aspects of the automated seamless migration functionality of the host device 102-1. The disclosed embodiments are therefore not limited to embodiments in which automated seamless migration functionality is controlled at least in part by an MPIO driver or multi-path layer.

As indicated previously, migration of logical storage volumes or other logical storage devices across multiple access protocols can be problematic. For example, host-based seamless migration in these and other contexts can be inefficient, consuming significant amounts of computational and network resources of the host device. Such requirements of conventional approaches can negatively impact the seamless migration process and thereby degrade overall system performance.

For example, some conventional host-based migration processes such as PowerPath® Migration Enabler (PPME) typically require that a host administrator and a storage administrator cooperate in setting up and executing the migration process, which in some circumstances can complicate the migration effort.

Storage-based migration processes such as Non-Destructive Migration (NDM) of a source device to a target device do not require such cooperation, but typically require device spoofing. More particularly, these storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver of a multi-path layer can merge the two device IDs into a single device ID for presentation to a host device processor layer, thereby avoiding the problems associated with spoofing.

The automated seamless migration techniques of illustrative embodiments disclosed herein provide significant advantages over these and other conventional approaches, while also avoiding the need for spoofing of logical storage device identifiers.

For example, some embodiments are configured to facilitate migration of a logical storage device from use of a first access protocol such as SCSI-FC to use of second access protocol such as NVMeF, in a particularly efficient manner that intelligently leverages application movement and multi-pathing functionality of a given host device environment. Automated seamless migration functionality across a wide variety of other access protocols are supported in other embodiments.

Such arrangements illustratively involve storing different versions of one or more host device operating system (OS) data structures in order to facilitate the seamless migration across the multiple access protocols. Some embodiments disclosed herein utilize a multi-path layer of one or more host devices in performing the migration across the multiple access protocols, in a manner that ensures that the logical storage device appears to a given host device OS as a single logical storage device.

In accordance with the automated seamless migration functionality, an MPIO layer comprising MPIO drivers 112-1 and 112-2 of respective host devices 102-1 and 102-2 is configured to store a first version of a host OS data structure comprising a first identifier of a logical storage device associated with a first access protocol, and in conjunction with migration of the logical storage device from utilization of the first access protocol to utilization of a second access protocol different than the first access protocol, to temporarily continue to present information from the first version of the OS data structure in response to one or more requests relating to the logical storage device, to obtain a second identifier of the logical storage device associated with the second access protocol, to store a second version of the host OS data structure comprising the second identifier of the logical storage device associated with the second access protocol, and to switch from presenting information from the first version of the host OS data structure to presenting information from the second version of the host OS data structure. The switch in presenting information is illustratively timed to ensure that the logical storage device appears to the host OS as the same device both before and after the migration from the first access protocol to the second access protocol.

As indicated above, the first access protocol illustratively comprises a SCSI-FC access protocol and the second access protocol illustratively comprises an NVMeF access protocol, although other access protocols can be used.

In some embodiments, the MPIO layer receives an access protocol change notification, which initiates the process of automated seamless migration of the logical storage device from the first access protocol to the second access protocol. For example, responsive to receipt of the access protocol change notification, the MPIO layer is illustratively configured to store the first version of the host OS data structure comprising the first identifier of the logical storage device associated with the first access protocol.

The access protocol change notification in some embodiments comprises a check condition notification received from one of the storage arrays 105 that includes the logical storage device, and/or at least one command entered by an administrator or other user via a command line interface (CLI) or other user interface of at least one of the host devices 102.

In some embodiments, the MPIO driver 112-1 of the first host device 102-1 is configured to store the first and second versions of the host OS data structure and to control the migration of the logical storage device from utilization of the first access protocol to utilization of the second access protocol, although other arrangements of MPIO layer or host device components can perform these and other related operations in other embodiments.

The MPIO driver 112-1 can obtain the first identifier of the logical storage device associated with the first access protocol by sending a designated command in the first access protocol to the storage array 105-1 and receiving the first identifier from the storage array 105-1 in response to the designated command in the first access protocol.

Similarly, the MPIO driver 112-1 can obtain the second identifier of the logical storage device associated with the second access protocol by sending a designated command in the second access protocol to the storage array 105-1 and receiving the second identifier from the storage array 105-1 in response to the designated command in the second access protocol.

These or other similar operations can additionally or alternatively be performed by interaction between the MPIO driver 112-1 and the second storage array 105-2, interaction between the MPIO driver 112-2 and the second storage array 105-2, and/or interaction between the MPIO driver 112-2 and the first storage array 105-1.

In some embodiments, the first version of the host OS data structure comprises a virtual machine file system (VMFS) header or other type of VMFS data structure that includes the first identifier of the logical storage device and the second version of the host OS data structure comprises the VMFS header or other VMFS data structure updated to replace the first identifier of the logical storage device with the second identifier of the logical storage device. A wide variety of additional or alternative types of host OS data structures can be used in other embodiments. The term "host OS data structure" as used herein is therefore intended to be broadly construed, so as to encompass numerous different types of data structures that are utilized by a host device in conjunction with accessing a given logical storage device and that incorporate an identifier of the logical storage device.

In some embodiments, in conjunction with the migration of the logical storage device from utilization of the first access protocol to utilization of the second access protocol, one or more applications that utilize the logical storage device are temporarily moved from the first host device 102-1 to the second host device 102-2, where both host devices 102 are configured to access the logical storage device. The access protocol for the logical storage device is then changed from the first access protocol to the second access protocol on the second host device 102-2, and the one or more applications are subsequently moved back from the second host device 102-2 to the first host device 102-1. This is illustratively achieved by using vMotion functionality of an ESXi environment to non-disruptively migrate one or more virtual machines that execute the one or more applications from the first host device 102-1 to the second host device 102-2, and subsequently back from the second host device 102-2 to the first host device 102-1. In accordance with the vMotion functionality, the one or more applications can continue to execute while being migrated between ESXi servers. Other application movement techniques can be used in other types of host environments.

In some embodiments, in conjunction with the temporary move of the one or more applications from the first host device 102-1 to the second host device 102-2, a masking of the logical storage device to the first host device 102-1 is modified from a first masking utilizing the first access protocol to a second masking utilizing the second access protocol.

The switch in presenting information from the first version of the host OS data structure to presenting information from the second version of the host OS data structure is illustratively timed to occur in some embodiments subsequent to completion of the modification in the masking of the logical storage device to the first host device 102-1 from the first masking utilizing the first access protocol to the second masking utilizing the second access protocol, although other timing arrangements can be used in other embodiments in order to ensure that the host OS on the first host device 102-1 substantially continuously sees the logical storage device as the same logical storage device throughout the migration of that device from utilization of the first access protocol to utilization of the second access protocol.

Also, in conjunction with the subsequent move of the one or more applications back from the second host device 102-2 to the first host device 102-1, a masking of the logical storage device to the second host device 102-2 is modified from a first masking utilizing the first access protocol to a second masking utilizing the second access protocol.

Both of the host devices 102-1 and 102-2 can thereby illustratively access the logical storage device using the second access protocol. Migration back from use of the second access protocol to use of the first access protocol can also be achieved, using operations similar to those described above.

It should be noted that references in the above description and elsewhere herein to single logical storage devices are non-limiting, and other embodiments can migrate multiple logical storage devices across access protocols, through straightforward modification of the techniques disclosed herein, as will be readily apparent to those skilled in the art.

In some embodiments, the MPIO driver 112-1 utilizes its different stored versions of the host OS data structure to maintain multiple device identities for the logical storage device, while presenting a corresponding pseudo device or other type of composite device having a single device identity to one or more upper layers of the host device 102-1.

Such embodiments advantageously facilitate the transition of NVMeF adoption within system 100 by providing automated seamless migration from SCSI-FC to NVMeF for logical storage devices of the system 100. For example, some existing HBAs support both multiple access protocols, such as SCSI-FC and NVMeF modes, so in systems with such HBAs there is no need to change hardware in order to migrate between the two different access protocols. However, as indicated previously, conventional migration techniques in these and other contexts can consume excessive amounts of host resources, and are therefore inefficient and undermine system performance.

The above-described features of illustrative embodiments are examples of what is more generally referred to herein as "automated seamless migration" of logical storage devices. Illustrative embodiments are "automated" in that no coordination between a host administrator and a storage administrator is required, and are also "seamless" in that each host device seamlessly transitions from usage of the first access protocol to usage of the second access protocol to access the logical storage device, illustratively without disrupting the operation of applications that utilize that logical storage device. Other advantages are provided by other automated seamless migration arrangements in other embodiments.

The above-described functions associated with automated seamless migration functionality of the host device 102-1 are illustratively carried out at least in part utilizing the MPIO driver 112-1 and its path selection logic 114-1. For example, in some embodiments, the seamless migration functionality can be implemented substantially entirely under the control of the MPIO driver 112-1, and in such embodiments the path selection logic 114-1 is illustratively configured to control performance of one or more steps of the flow diagram to be described below in conjunction with FIG. 2. Additional or alternative host device components, such as migration control logic implemented in the host device, can be used to control performance of an automated seamless migration process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed automated seamless migration functionality. Accordingly, aspects of automated seamless migration functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support automated seamless migration.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the automated seamless migration functionality.

The operation of the information processing system 100 will now be described in further detail with reference to the flow diagram of the illustrative embodiment of FIG. 2. The process as shown includes steps 200 through 214, and is suitable for use in the system 100 but is more generally applicable to other types of systems comprising first and second host devices and at least one storage system. The first and second host devices are illustratively the first and second host devices 102-1 and 102-2 of FIG. 1, and the storage system illustratively comprises one or both of the storage arrays 105, with each such storage array comprising a plurality of storage devices. The storage devices of each such storage array are assumed to include logical storage devices such as LUNs or other logical storage volumes.

Figure 2:
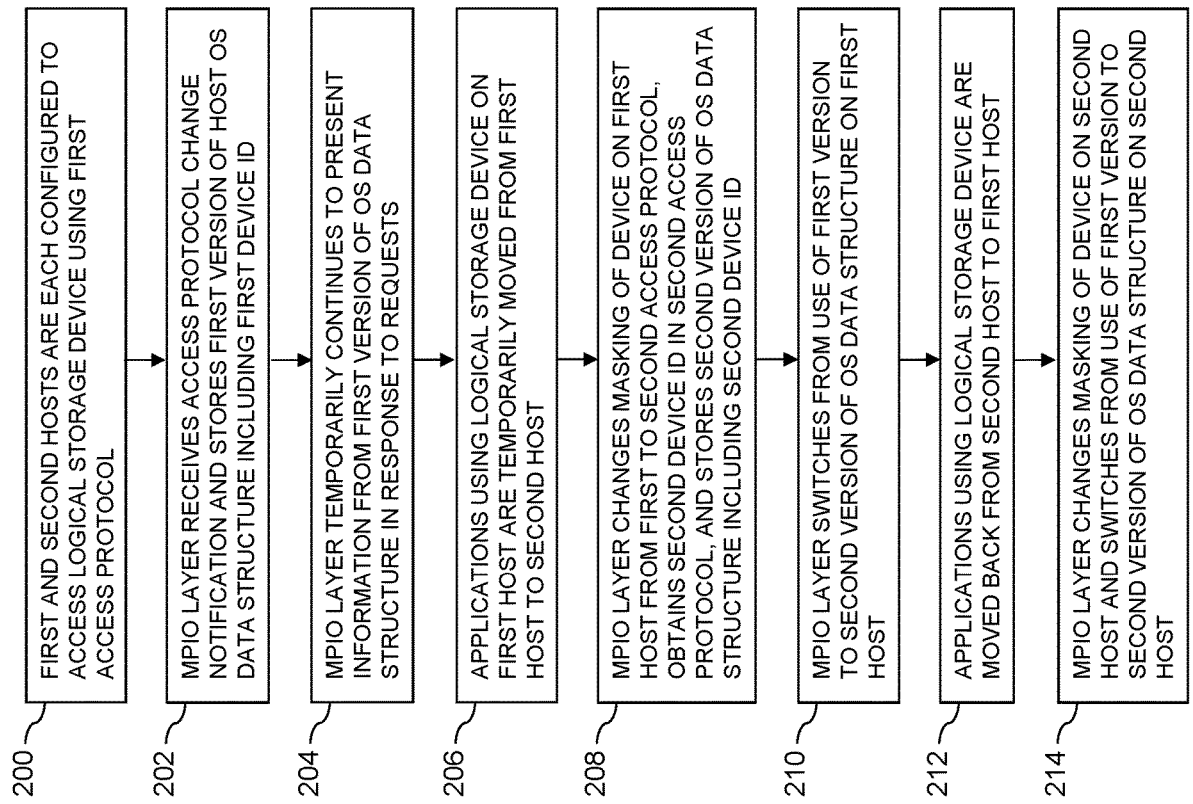
FIG. 2 is a flow diagram of a process for automated seamless migration across access protocols utilizing a multi-path layer of a host device in an illustrative embodiment.

The steps of the FIG. 2 process are illustratively performed primarily by or under the control of an MPIO layer comprising one or more MPIO drivers of respective host devices, such as the MPIO drivers 112-1 and 112-2 of the first and second host devices 102-1 and 102-2 of system 100, although other arrangements of system components can perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in the FIG. 2 process and elsewhere herein.

In step 200, the first and second hosts are each configured to access a logical storage device using a first access protocol, illustratively a SCSI access protocol. The FIG. 2 process involves migration of the logical storage device from utilization of the SCSI access protocol to utilization of another access protocol, illustratively an NVMe access protocol, although it is to be appreciated that other types of access protocols can be used. The SCSI and NVMe protocols utilized in the present embodiment are examples of what are more generally referred to herein as "first and second access protocols." The SCSI and NVMe protocols may more particularly comprise SCSI-FC and NVMeF access protocols, respectively, although numerous other types of first and second access protocols can be used in other embodiments. The logical storage device illustratively comprises a LUN or other type of logical storage volume implemented using storage devices of one or more of the storage arrays 105.

In step 202, the MPIO layer receives an access protocol change notification and stores a first version of a host OS data structure including a first device ID for the logical storage device that is currently using the first access protocol. The access protocol change notification in some embodiments comprises a check condition notification received from one of the storage arrays 105. As another example, the access protocol change notification can be in the form of one or more commands entered via a user interface of each of the first and second hosts, although other types of notifications can be used.

In step 204, the MPIO layer temporarily continues to present information from the first version of the host OS data structure in response to one or more requests relating to the logical storage device.

In step 206, one or more applications using the logical storage device on the first host are temporarily moved from the first host to the second host. For example, in some embodiments, vMotion functionality of virtualization software of the first and second hosts is utilized to perform live migration of one or more virtual machines that execute the one or more applications from the first host to the second host. The first and second hosts in such an embodiment illustratively comprise respective ESXi servers, although other types of hosts and application migration techniques can be used in other embodiments.

In step 208, the MPIO layer changes the masking of the logical storage device on the first host from the first access protocol to the second access protocol, obtains a second device ID for the logical storage device in the second access protocol, and stores a second version of the host OS data structure including the second device ID.

In step 210, the MPIO layer switches from use of the first version of the host OS data structure to use of the second version of the host OS data structure on the first host.

In step 212, the one or more applications using the logical storage device are moved back from the second host to the first host.

In step 214, the MPIO layer changes the masking of the logical storage device on the second host and switches from use of the first version of the host OS data structure to use of the second version of the host OS data structure on the second host.

At completion of step 214, both the first and second hosts are each configured to access the logical storage device using the second access protocol. Subsequent migration of the logical storage device from the second access protocol back to the first access protocol can be achieved if needed using similar process steps.

The steps of the FIG. 2 process are shown in sequential order for clarity and simplicity of illustration only, and certain steps can at least partially overlap with other steps. Also, one or more of the steps referred to as being performed by a particular system component, such as an MPIO layer comprising one or more MPIO drivers, can in other embodiments be performed at least in part by one or more other system components.

As indicated above, different instances of the FIG. 2 process can execute at least in part in parallel with one another for different logical storage devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and automated seamless migration functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated seamless migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
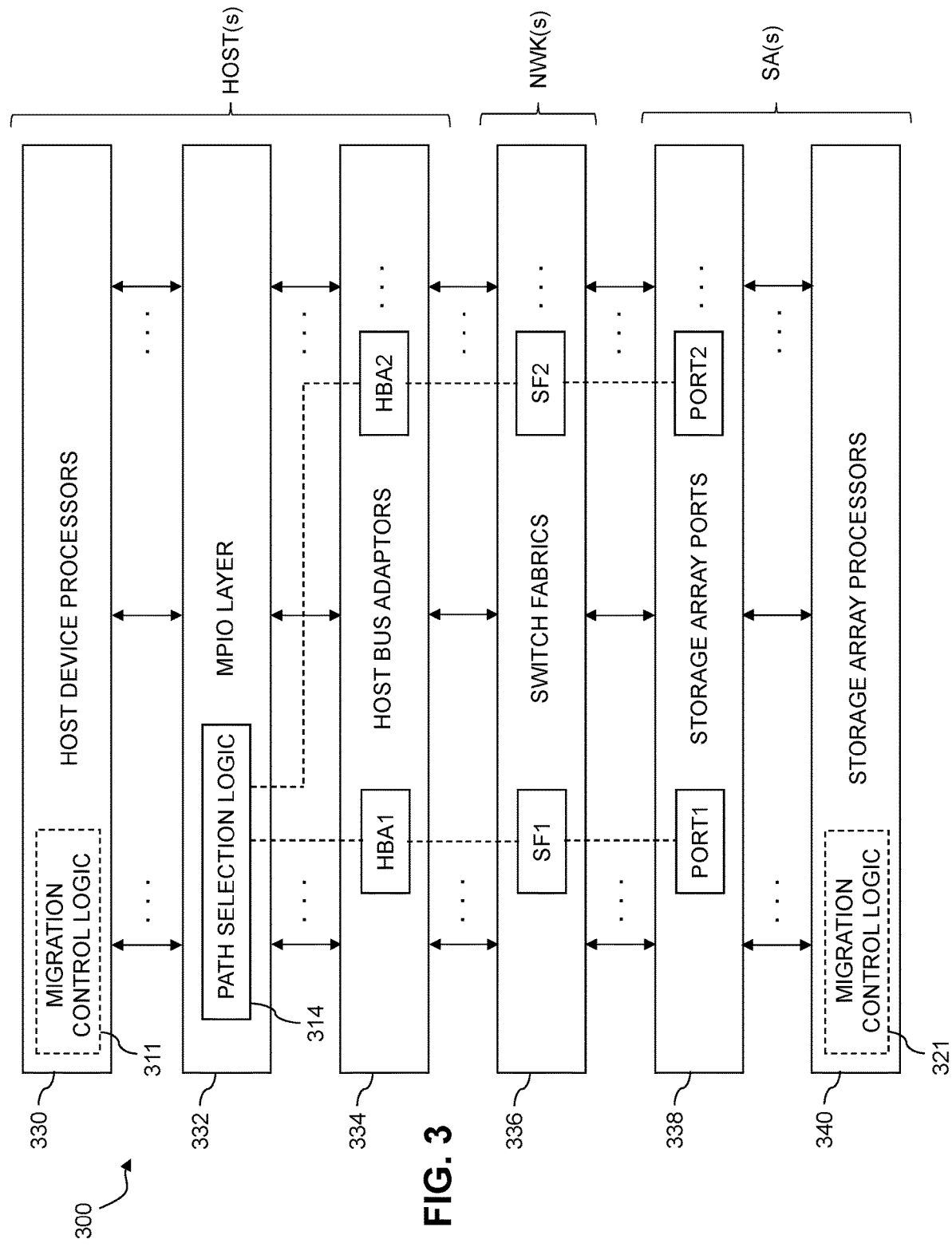
FIG. 3 is a block diagram showing multiple layers of a layered system architecture that includes a multi-path layer with automated seamless migration functionality in an illustrative embodiment.

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated seamless migration of logical storage volumes or other logical storage devices across multiple access protocols. The logical storage devices store data for one or more application processes running in one or more host device processors of the host device processor layer 330. The automated seamless migration functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for automated seamless migration of logical storage devices across multiple access protocols as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the functionality for automated seamless migration of logical storage devices across multiple access protocols as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for automated seamless migration, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Another example of an automated seamless migration process implemented utilizing an MPIO layer such as MPIO layer 332 of the FIG. 3 embodiment will now be described in more detail. In this example, automated seamless migration of a logical storage device from a first access protocol to a second access protocol is provided. The automated seamless migration process utilizes first and second host devices, also referred to as simply first and second hosts, in migrating the logical storage device across access protocols.

The process in the present example comprises an algorithm performed by first and second hosts and at least one storage array, with the first and second hosts illustratively utilizing their respective MPIO drivers to perform at least portions of the algorithm. In this example algorithm, one or more applications are temporarily moved from the first host to the second host, and then moved back from the second host to the first host, in conjunction with migration of the logical storage device across access protocols.

Concurrent usage of different protocols to access a logical storage device in a storage system environment is often not supported due to host OS limitations in handling two identities for the same logical storage device. For example, a SCSI-FC device identity for a given logical storage device is different than an NVMeF device identity for that same logical storage device. The host OS will see two different logical storage devices even though there is only a single logical storage device. If these two different host OS identities are presented to respective ones of two applications executing on the host, one of the applications could overwrite logical storage device data of the other application, resulting in data loss.

SCSI-FC is an example of what is more generally referred to herein as a SCSI access protocol, where FC denotes Fibre Channel.

NVMeF is an example of what is more generally referred to herein as an NVMe access protocol, where NVMeF denotes NVMe over Fabrics.

As indicated previously, it is difficult under conventional practice to seamlessly migrate a logical storage device from SCSI-FC to NVMeF when the migration involves multiple hosts concurrently connected to a storage array or other type of storage system. These and other problems of conventional practice are overcome using techniques disclosed herein.

For example, some embodiments allow usage of the same logical storage device with multiple access protocols by storing different versions of the OS data structure and presenting information from these different versions of the OS data structure in a manner that ensures that the host OS will see the corresponding distinct logical storage device identities as the same logical storage device. As disclosed herein, such an approach can enable migration of the logical storage device between access protocols.

Virtualized environments (e.g., with ESXi servers) allow seamless movement of an application from one server to another (e.g., using vMotion to move an application between ESXi servers). Such seamless application movements are utilized in illustrative embodiments herein to seamlessly migrate a logical storage device between different access protocols, for example, by moving the application from a first host device that does issue IO operations to the storage device to a second host device that does not issue IO operations to the storage device, and then changing the access protocol for the storage device on the second host device that does not issue IO operations to the storage device.

Some embodiments combine such application movements with MPIO enhancements to store different versions of host OS data structures to allow seamless protocol migration. The host OS data structure versions are used to temporarily hide from the host OS the differences in device identity representation between access protocols, which allows seamless migration between access protocols. For example, some embodiments can allow identification of "storage device A" in an ESXi environment as "storage device A" regardless of whether storage device A is masked via SCSI-FC or NVMeF. ESXi is used as a non-limiting example only, and the same or similar techniques can be used in a wide variety of other host device environments, including, for example, any host device environment allowing application movement functionality such as vMotion, possibly in conjunction with recording of logical storage device ID or other related information on device media.

The example algorithm for implementing the storage access protocol migration techniques illustratively includes the following steps:

1. The storage array is configured to provide the same logical storage device identifier information in its response to a SCSI-FC Inq Page 83 command (e.g., a SCSI-FC NAA device ID) also in its response to an NVMeF Identify command (e.g., an EUI-64 format device ID) in order to allow the MPIO layer to associate the device ID sent over SCSI-FC with the device ID sent over NVMeF. Here, NAA denotes a Network Address Authority device ID format, and EUI-64 denotes a 64-bit Extended Unique Identifier device ID format. Other techniques can be used to obtain logical storage device identifiers in other embodiments.

2. An otherwise conventional virtualized MPIO layer (e.g., PowerPath®/VE) is enhanced to support functionality for migration of logical storage devices across multiple access protocols as disclosed herein.

3. The initial environment includes a first ESXi server denoted ESXi-1, with ESXi-1 communicating over SCSI-FC with a logical storage device using the above-noted enhanced MPIO (e.g., PowerPath®/VE). The present example algorithm is configured to allow ESXi-1 to swap from communicating over SCSI-FC to communicating over NVMeF with the logical storage device.

4. In a given ESXi server, a SCSI-FC device has a different representation than an NVMeF device, and they are considered two different devices regardless of what is returned in response to the above-noted Inq Page 83 and NVMeF Identify commands.

5. A second ESXi server denoted ESXi-2 also has enhanced MPIO functionality as disclosed herein and will be connected to the storage array and configured to communicate with the storage array over SCSI-FC.

6. The storage device that ESXi-1 is communicating with (over SCSI-FC) will be also masked to the ESXi-2 server. Now both ESXi-1 and ESXi-2 can communicate with the logical storage device over SCSI-FC.

7. The environment is ready for a protocol change.

8. In order to notify all hosts communicating with the logical storage device regarding the upcoming protocol change, one of the following techniques can be used to inform all hosts on the change:

(a) The user will order the storage array to return to each host communicating with the device the existing chk_cond notification, meaning "Inq data has changed," on the next IO. This will indicate to all connected hosts the need to prepare for the coming protocol change.

(b) The user will login to each host communicating with the storage device and notify it on the need to prepare for the coming protocol change.

The above techniques (a) and (b) are examples only, and alternative protocol change notification techniques can be used, including fully automated techniques. The "user" may be an administrator ("admin") or another type of user, such as an automated software-based entity rather than a human user.

9. The MPIO driver on each host communicating with the logical storage device, receiving the notification described above, will cache the current host OS data structure describing the device identity (e.g., a VMFS data structure). Subsequent accesses to the device identity in the host OS data structure (e.g., the VMFS data structure) will receive this cached information rather than what the device is actually returning at the time of access.

10. Utilize vMotion to move all VMs and their associated applications that are hosted on this OS datastore (e.g., a VMFS datastore) from ESXi-1 to ESXi-2. ESXi-1 will stop communicating with the device.

11. The device will be un-masked from ESXi-1 (over SCSI-FC).

12. The device will be masked back to ESXi-1 but over NVMeF, and mounted.

13. The enhanced MPIO driver on ESXi-1 will issue an Identify command and receive the device Identify command payload including device ID in EU-I64 format (with the same device ID information as the SCSI Inq page 83 NAA device ID).

14. In the process of new device registration, the MPIO driver on ESXi-1, with advanced knowledge of the protocol change from Step 8, will update its stored version of the OS data structure (e.g., the VMFS data structure) to the new NVMeF layout, to avoid the need to perform a VMFS re-signature process on ESXi-1. The updated OS data structure will prevent a mismatch between the device ID as currently reflected in the OS data structure and the returning device ID on the new protocol.

15. ESXi-2 is not impacted by the new signature on the device, as the returned signature from the device is not reported to the OS on ESXi-2. Instead, the MPIO driver on ESXI-2 will report the cached device identity (e.g., the cached version of the VMFS data structure) which is still in SCSI-FC NAA device ID format.

16. The device will be mounted to ESXi-1 over NVMeF. The ESXi-1 OS will see that the device identifier as per NVMeF EUI64 ID since it had been re-signatured from ESXi-1 over NVMeF.

17. The one or more previously-moved VMs and their corresponding one or more applications will then be moved back (e.g., using vMotion) from ESXi-2 to ESXi-1.

18. Unmask the SCSI-FC device from ESXi-2.

19. Mask the device back to ESXi-2 over NVMe-FC. The MPIO driver registers the NVMe device using the device identifier from the NVMeF Identify command.

20. Host virtualization software (e.g., VMWare) automatically mounts the VMFS filesystem on the NVMe device on ESXi-2.

21. The application(s) will remain working non-disruptively throughout the process of moving the device from SCSI-FC to NVMeF on ESXi-1.

This particular algorithm is presented by way of illustrative example only, and other embodiments can use other types of algorithms to provide the disclosed functionality for seamless migration across storage access protocols.

The MPIO driver portions of the above process may be similarly performed by other MPIO drivers on respective other host devices. Such MPIO drivers illustratively form a multi-path layer comprising multi-pathing software of the host devices.

Again, the above algorithm is presented by way of illustrative example only, and other embodiments can utilize additional or alternative steps. Also certain steps illustrated as being performed serially can instead be performed at least in part in parallel with one another.

Advantageously, illustrative embodiments can non-disruptively transform storage access protocol for a logical storage device from SCSI to NVMe or vice versa.

Additionally or alternatively, some embodiments provide a storage multi-pathing driver supporting more than one storage access protocol for a single managed device.

The particular automated seamless migration arrangements described above are presented by way of illustrative example only. Numerous alternative arrangements of these and other features can be used in implementing automated seamless migration across multiple access protocols in other embodiments.

It is apparent from the foregoing that the illustrative embodiments disclosed herein can provide a number of significant advantages relative to conventional arrangements. For example, some embodiments configure host devices comprising respective MPIO drivers to include functionality for automated seamless migration of logical storage volumes or other types of logical storage devices across multiple access protocols.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated automated seamless migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    at least one processing device comprising a processor coupled to a memory;
    said at least one processing device being configured:
    to store a first version of an operating system data structure comprising a first identifier of a logical storage device, the first identifier being assigned to the logical storage device in accordance with a first access protocol; and
    in conjunction with migration of the logical storage device from utilization of the first access protocol to utilization of a second access protocol different than the first access protocol:
    to temporarily continue to present device-identifying information from the first version of the operating system data structure in response to one or more access requests relating to the logical storage device;
    to obtain a second identifier of the logical storage device, the second identifier being assigned to the logical storage device in accordance with the second access protocol;
    to store a second version of the operating system data structure comprising the second identifier of the logical storage device; and
    to switch, from presenting device-identifying information from the first version of the operating system data structure in response to the one or more access requests relating to the logical storage device, to presenting device-identifying information from the second version of the operating system data structure in response to one or more additional access requests relating to the logical storage device.

2. The apparatus of claim 1 wherein the switching from presenting device-identifying information from the first version of the operating system data structure to presenting device-identifying information from the second version of the operating system data structure is timed to ensure that the logical storage device appears to a host operating system as the same device both before and after the migration from the first access protocol to the second access protocol.

3. The apparatus of claim 1 wherein the first access protocol comprises a Small Computer System Interface (SCSI) access protocol and the second access protocol comprises a Non-Volatile Memory Express (NVMe) access protocol, and further wherein the SCSI access protocol comprises a SCSI over Fibre Channel (SCSI-FC) access protocol and the NVMe access protocol comprises an NVMe over Fabrics (NVMeF) access protocol.

4. The apparatus of claim 1 wherein said at least one processing device is further configured:
    to receive an access protocol change notification;
    responsive to receipt of the access protocol change notification, to store the first version of the operating system data structure comprising the first identifier of the logical storage device;
    wherein the access protocol change notification comprises at least one of:

(i) a check condition notification received from a storage system that includes the logical storage device;

(ii) at least one command entered via a user interface of a host device coupled to the storage system.

5. The apparatus of claim 1 wherein said at least one processing device comprises at least a portion of at least one host device coupled to a storage system via at least one network.

6. The apparatus of claim 5 wherein said at least one host device comprises a multi-path layer, the multi-path layer comprising at least one multi-path input-output driver configured to control delivery of input-output operations from said at least one host device to the storage system over selected paths through the network.

7. The apparatus of claim 6 wherein said at least one multi-path input-output driver is configured to store the first and second versions of the operating system data structure and to control the migration of the logical storage device from utilization of the first access protocol to utilization of the second access protocol.

8. The apparatus of claim 1 wherein said at least one processing device is further configured to obtain the first identifier of the logical storage device by sending a designated command in the first access protocol to a storage system and receiving the first identifier from the storage system in response to the designated command in the first access protocol.

9. The apparatus of claim 8 wherein obtaining the second identifier of the logical storage device comprises sending a designated command in the second access protocol to the storage system and receiving the second identifier from the storage system in response to the designated command in the second access protocol.

10. The apparatus of claim 1 wherein the first version of the operating system data structure comprises a virtual machine file system header that includes the first identifier of the logical storage device and the second version of the operating system data structure comprises the virtual machine file system header updated to replace the first identifier of the logical storage device with the second identifier of the logical storage device.

11. The apparatus of claim 1 wherein said at least one processing device is further configured, in conjunction with the migration of the logical storage device from utilization of the first access protocol to utilization of the second access protocol:

to temporarily move at least one application that utilizes the logical storage device from a first host device configured to access the logical storage device to a second host device configured to access the logical storage device;

to change the access protocol for the logical storage device from the first access protocol to the second access protocol on the second host device; and to subsequently move said at least one application back from the second host device to the first host device.

12. The apparatus of claim 11 wherein said at least one processing device is further configured, in conjunction with the temporary move of said at least one application from the first host device to the second host device, to modify a masking of the logical storage device to the first host device from a first masking utilizing the first access protocol to a second masking utilizing the second access protocol.

13. The apparatus of claim 12 wherein the switching from presenting device-identifying information from the first version of the operating system data structure to presenting device-identifying information from the second version of the operating system data structure is timed to occur subsequent to completion of the modification in the masking of the logical storage device to the first host device from the first masking utilizing the first access protocol to the second masking utilizing the second access protocol.

14. The apparatus of claim 11 wherein said at least one processing device is further configured, in conjunction with the subsequent move of said at least one application back from the second host device to the first host device, to modify a masking of the logical storage device to the second host device from a first masking utilizing the first access protocol to a second masking utilizing the second access protocol.

15. A computer program product comprising a non-transitory processor-readable storage medium having stored therein program code of one or more software programs, wherein the program code, when executed by at least one processing device comprising a processor coupled to a memory and configured to communicate over a network with a storage system, causes said at least one processing device:

to store a first version of an operating system data structure comprising a first identifier of a logical storage device, the first identifier being assigned to the logical storage device in accordance with a first access protocol; and in conjunction with migration of the logical storage device from utilization of the first access protocol to utilization of a second access protocol different than the first access protocol:

to temporarily continue to present device-identifying information from the first version of the operating system data structure in response to one or more access requests relating to the logical storage device;

to obtain a second identifier of the logical storage device, the second identifier being assigned to the logical storage device in accordance with the second access protocol;

to store a second version of the operating system data structure comprising the second identifier of the logical storage device; and to switch, from presenting device-identifying information from the first version of the operating system data structure in response to the one or more access requests relating to the logical storage device, to presenting device-identifying information from the second version of the operating system data structure in response to one or more additional access requests relating to the logical storage device.

16. The computer program product of claim 15 wherein the first version of the operating system data structure comprises a virtual machine file system header that includes the first identifier of the logical storage device and the second version of the operating system data structure comprises the virtual machine file system header updated to replace the first identifier of the logical storage device with the second identifier of the logical storage device.

17. The computer program product of claim 15 wherein the program code, when executed by said at least one processing device, further causes said at least one processing device, in conjunction with the migration of the logical storage device from utilization of the first access protocol to utilization of the second access protocol:

to temporarily move at least one application that utilizes the logical storage device from a first host device configured to access the logical storage device to a second host device configured to access the logical storage device;

to change the access protocol for the logical storage device from the first access protocol to the second access protocol on the second host device; and to subsequently move said at least one application back from the second host device to the first host device.

18. A method comprising:

storing a first version of an operating system data structure comprising a first identifier of a logical storage device, the first identifier being assigned to the logical storage device in accordance with a first access protocol; and in conjunction with migration of the logical storage device from utilization of the first access protocol to utilization of a second access protocol different than the first access protocol:

temporarily continuing to present device-identifying information from the first version of the operating system data structure in response to one or more access requests relating to the logical storage device;

obtaining a second identifier of the logical storage device, the second identifier being assigned to the logical storage device in accordance with the second access protocol;

storing a second version of the operating system data structure comprising the second identifier of the logical storage device; and switching, from presenting device-identifying information from the first version of the operating system data structure in response to the one or more access requests relating to the logical storage device, to presenting device-identifying information from the second version of the operating system data structure in response to one or more additional access requests relating to the logical storage device;

wherein the method is performed by at least one processing device comprising a processor coupled to a memory.

19. The method of claim 18 wherein the first version of the operating system data structure comprises a virtual machine file system header that includes the first identifier of the logical storage device and the second version of the operating system data structure comprises the virtual machine file system header updated to replace the first identifier of the logical storage device with the second identifier of the logical storage device.

20. The method of claim 18 further comprising, in conjunction with the migration of the logical storage device from utilization of the first access protocol to utilization of the second access protocol:

temporarily moving at least one application that utilizes the logical storage device from a first host device configured to access the logical storage device to a second host device configured to access the logical storage device;

changing the access protocol for the logical storage device from the first access protocol to the second access protocol on the second host device; and subsequently moving said at least one application back from the second host device to the first host device.

\* \* \* \* \*